United States Patent [19]

Drysdale et al.

[11] Patent Number: 6,040,419
[45] Date of Patent: Mar. 21, 2000

[54] PROCESS FOR THE POLYMERIZATION OF CYCLIC ETHERS

[75] Inventors: Neville Everton Drysdale, Newark; Lin Wang, Hockessin; Zhen-Yu Yang, Wilmington, all of Del.

[73] Assignee: E. I. du Pont de Nemours and Company, Wilmington, Del.

[21] Appl. No.: 09/101,905

[22] PCT Filed: Jan. 22, 1997

[86] PCT No.: PCT/US97/00930

§ 371 Date: Jul. 20, 1998

§ 102(e) Date: Jul. 20, 1998

[87] PCT Pub. No.: WO97/27238

PCT Pub. Date: Jul. 31, 1997

Related U.S. Application Data

[60] Provisional application No. 60/010,515, Jan. 24, 1996.

[51] Int. Cl.$^7$ .................................................... C08G 59/68
[52] U.S. Cl. ........................... 528/408; 528/417; 528/421
[58] Field of Search ................................... 528/408, 417, 528/421

[56] References Cited

U.S. PATENT DOCUMENTS

| | | | |
|---|---|---|---|
| 4,120,903 | 10/1978 | Pruckmayr et al. | 260/615 |
| 4,139,567 | 2/1979 | Pruckmayr | 568/613 |
| 4,153,786 | 5/1979 | Pruckmayr | 528/408 |
| 4,163,115 | 7/1979 | Heinsohn | 560/240 |
| 4,214,070 | 7/1980 | Krespan | 528/220 |
| 5,118,869 | 6/1992 | Dorai et al. | 568/617 |
| 5,130,470 | 7/1992 | Dorai et al. | 560/200 |

FOREIGN PATENT DOCUMENTS

| | | |
|---|---|---|
| WO 96/23010 | 8/1996 | WIPO . |
| WO 97/27238 | 7/1997 | WIPO . |
| WO 98/31716 | 7/1998 | WIPO . |

OTHER PUBLICATIONS

B. Elvers et al., Polyoxyalkylenes (VCH Verlagsgesellschaft mbH, Weinheim), *Ullmann's Encyclopedia of Industrial Chemistry*, vol. A21, 5th Ed., 583–584, 1992.

H. Mark et al., Tetrahydrofuran Polymers (John Wiley & Sons, New York), *Encyclopedia of Polymer Science and Engineering*, vol. 16, 2nd Ed., 658–668, 1989.

H. Mark et al., Radiation Curing (John Wiley & Sons, New York), *Encylopedia of Polymer Science and Engineering*, vol. 13, 667–682, 1988.

J. Brandrup et al., Decomposition Rates of Organic Free Radical Initiators (John Wiley & Sons, New York), *Polymer Handbook*, 3rd Ed., II/1–II/65, 1989.

H. Mark et al., Radical Polymerization (John Wiley & Sons, New York), *Encyclopedia of Polymer Science and Engineering*, vol. 13, 754–789, 1988.

W. Huang et al., Sulfinatodehalogenation VIII (Abstract No. 83935q), *Chemical Abstracts*, vol. 106, No. 11, 549, Mar. 16, 1987.

*Primary Examiner*—Melvyn I. Marquis

[57] ABSTRACT

An improved process for the polymerization of cyclic ethers to polyethers using strong Bronsted acid catalysts is disclosed. The catalysts are fluorinated sulfonic acid containing polymers. The resulting polyethers are useful as monomers and in adhesives.

19 Claims, No Drawings

PROCESS FOR THE POLYMERIZATION OF CYCLIC ETHERS

CROSS-REFERENCE TO RELATED APPLICATION

This application claims the benefit of U.S. Provisional Application Ser. No. 60/010,515, filed Jan. 24, 1996 and PCT International Application PCT/US97/00930, filed Jan. 22, 1997, wherein the United States was a designated country.

FIELD OF THE INVENTION

This invention generally relates to an improved polymerization process for cyclic ethers using as a catalyst a polymer which contains a large amount of hydrocarbon, and also contains sulfonic acid groups which are fluorinated in at least the alpha and beta positions.

BACKGROUND OF THE INVENTION

Polyethers are important items of commerce, being useful as monomers in polyurethane polymers which are useful as molding resins and spandex fibers, in adhesives, and for many other uses. One common method of making polyethers is the ring opening polymerization of cyclic ethers, such as oxiranes (epoxides), oxetanes, tetrahydrofurans, etc. It is known that oxiranes are particularly susceptible to such ring opening reactions such as polymerization, but other cyclic ethers typically require strong cationic (or other type) of catalysts.

One such type of catalyst include strong Bronsted acids, for example fuming sulfuric or fluorosulfonic acid. It is also known that highly fluorinated organic sulfonic acids are effective catalysts. These sulfonic acids may be low molecular weight compounds or may be part of polymers, particularly perfluorinated polymers; see for instance B. Elvers, et al., Ed., Ullmann's Encyclopedia of Industrial Chemistry, 5th Ed., Vol. A21, VCH Verlagsgesellschaft mbH, Weinheim, 1992, p. 583–584; H. Mark, et al., Ed., Encyclopedia of Polymer Science and Engineering, 2nd Ed., Vol. 16, John Wiley & Sons, New York, 1989, p. 658–668; and U.S. Pat. Nos. 4,120,903; 4,139,567; 4,153,786; 4,163,115; 5,118,869; and 5,130,470. However, with such perfluorinated polymers polymerization, rates often tend to be relatively slow. One advantage of using such polymeric sulfonic acids is that if the sulfonic acid containing polymer is insoluble in the polymerization medium, the acid catalyst is easily separated from the polyether product.

SUMMARY OF THE INVENTION

This invention concerns a process for the polymerization of cyclic ethers using a strong Bronsted acid catalyst, wherein the improvement comprises, using as said strong Bronsted acid catalyst a fluorinated sulfonic acid containing polymer, provided that said fluorinated sulfonic acid containing polymer:

contains at least about 0.05 equivalents of fluorinated sulfonic acid group per kg of said sulfonic acid containing polymer;

contains more hydrogen atoms bound to carbon than fluorine atoms bound to carbon; and said fluorinated sulfonic acid is contained within the grouping —$CR^1R^2CR^3R^4SO_3H$ wherein $R^1$, $R^2$, $R^3$, and $R^4$ are each independently fluorine or perfluoroalkyl.

DETAILED DESCRIPTION OF THE PREFERRED EMBODIMENTS

In the process described herein, cyclic ethers are polymerized to usually linear polyethers using as a catalyst a fluorinated sulfonic acid containing polymer (FSAP). The polymerization of cyclic ethers using strong Bronsted acids is known, see for instance B. Elvers, et al., Ed., Ullmann's Encyclopedia of Industrial Chemistry, 5th Ed., Vol. A21, VCH Verlagsgesellschaft mbH, Weinheim, 1992, p. 583–584; H. Mark, et al., Ed., Encyclopedia of Polymer Science and Engineering, 2nd Ed., Vol. 16, John Wiley & Sons, New York, 1989, p. 658–668; and U.S. Pat. Nos. 5,118,869 and 5,130,470. Typically, the cyclic ether is contacted with the strong Bronsted acid to form the polymer. Often a "co-catalyst" is also present. Such co-catalyst compounds are typically carboxylic acids, carboxylic acid anhydrides, or acyl halides. Portions of these co-catalysts often become part of some or all of the end groups of the resulting polyethers. For instance, if a carboxylic acid anhydride is present, some or all of the polyether end groups are usually esters. If hydroxyl end groups are desired, these esters may be subsequently hydrolyzed.

As used herein, "strong Bronsted acid" means a Bronsted acid whose pKa in water at 25° C. is less than 0, preferably less than −1.

It is preferred that the FSAP have a number average molecular weight of about 2,000 or more, preferably about 5,000 or more, or is crosslinked, which herein is considered to be an infinite molecular weight. The polymer may be crosslinked by methods known to the artisan, such as by using peroxides, optionally with coagents. Alternatively, the FSAP may be attached to a solid or insoluble material, either chemically and/or physically. Such crosslinking or attachment allows easy separation of the FSAP from the product polyether. Such crosslinked or attached polymer is particularly useful in a continuous polymerization process.

In the FSAP described herein, (at least some of) the sulfonic acid groups present are in the grouping —$CR^1R^2CR^3R^4SO_3H$ wherein $R^1$, $R^2$, $R^3$, and $R^4$ are each independently fluorine or perfluoroalkyl. It is preferred that all of $R^1$, $R^2$, $R^3$, and $R^4$ are fluorine. The free bond to a carbon atom in this grouping may be to any other atoms such as carbon or (ether) oxygen.

It is preferred that there are about 0.1 equivalents or more of sulfonic acid groups per kg of FSAP, preferably about 0.5 to about 2.0 equivalents per kg, more preferably about 0.7 to about 1.5 equivalents per kg.

In the FSAP there are more hydrogen atoms bound to carbon atoms than fluorine atoms bound to carbon atoms, and preferably the ratio of such hydrogen atoms to such fluorine atoms is about 3 or more, more preferably about 5 to about 150. It is also preferred that the FSAP is soluble in tetrahydrofuran at 25° C. By "soluble" is meant that at least a 2 weight percent solution can be formed. Typically, at least about 95 weight percent of the FSAP is soluble in tetrahydrofuran when the FSAP is not crosslinked or bound to a support. This is contrary to most of the prior art references cited herein, wherein the polymer should be relatively insoluble in THF. If the FSAP is crosslinked or bound to a support, the solubility "test" is done with polymer of the same composition which is not crosslinked or bound to a support.

A preferred FSAP is a hydrolyzed copolymer of ethylene or an α-olefin of the formula $R^5CH{=}CH_2$, wherein $R^5$ is hydrocarbyl containing 1 to 20 carbon atoms, with a comonomer of the formula $H_2C{=}CH(CH_2)_a R^6CR^1R^2CR^3R^4SO_2X$, wherein a is an integer of 2 to 20, $R^6$ is a covalent bond or perfluoroalkylene containing 1 to 20 carbon atoms and optionally containing one or more ether groups, X is halogen, and $R^1$, $R^2$, $R^3$, and $R^4$ are as defined above. It is preferred that $R^6$ is a covalent bond, —$(CF_2)_b$— wherein b is 2 to 20, or —$(CF_2)_dOCF_2CF_2$— wherein d is 2 to 20. It is also preferred that X is fluorine. Preferred comonomers are ethylene or propylene or a combination of the two. Another preferred comonomer is an olefinic ester or carboxylic acid which can provide a curesite, such as methyl acrylate or acrylic acid. Another useful curesite comonomer is a diene. It is also preferred that repeat units derived from the fluorinated comonomer are about 0.3 to about 50 mole percent of the repeat units in the FSAP.

Such homo- and copolymers can be made as described herein, in commonly assigned copending Application Number entitled "α-Olefins and Olefin Polymers and Processes Therefor", filed Jan. 24, 1996 as application Ser. No. 590, 650, U.S. Pat. No. 5,880,241, which corresponds also to WO 96/23010, also filed Jan. 24, 1996.

Another preferred FSAP may be made by free radical grafting of a preexisting polymer with a compound of the formula $H_2C$=$CHCF_2R^6CR^1R^2CR^3R^4SO_2X$, $R^6$ is a covalent bond, fluorosubstituted alkylene containing 1 to 20 carbon atoms and optionally containing one or more ether groups, or alkylene containing 1 to 20 carbon atoms and optionally containing one or more ether groups, X is fluorine or —OH or any other sulfonic acid derivative, and $R^1$, $R^2$, $R^3$, and $R^4$ are as defined above. It is preferred that $R^6$ is a covalent bond or perfluoroalkylene, more preferably —$(CF_2)_b$— wherein b is 2 to 20, or —$(CF_2)_dOCF_2CF_2$— wherein d is 2 to 20. The sulfonyl fluoride may then be at least partially hydrolyzed to the sulfonic acid. The branch that is formed usually has the formula —$CH_2$—$CHCF_2R^6CR^1R^2CR^3R^4SO_2X$. This grafting process is described in commonly assigned copending application Ser. No. 60/035,873, filed concurrently herewith on Jan. 22, 1997 (CL-1008), entitled "Grafting of Polymers with Fluorocarbon Compounds", which corresponds to WO 98/31716.

The polymer which is grafted should not be grossly decomposed or depolymerized in the presence of free radicals, although the polymer may be crosslinked or somewhat reduced in molecular weight during exposure to the free radicals. A polymer which is originally crosslinked may also be grafted. A preferred polymer to be grafted is a polyether or a polyolefin, and polyethylene is a preferred polymer to be grafted. It is well known in the art which polymers may be free radically grafted, see for instance H. Mark, et al., Ed., Encyclopedia of Polymer Science and Engineering, vol. 13, John Wiley & Sons, New York, 1988, p. 667–682, which is hereby included by reference. Sources of free radicals are also well known, see for instance J. Brandrup, et al., Ed., Polymer Handbook, 3rd Ed., John Wiley & Sons, New York, 1989, p. II-1 to II-65 and H. Mark, et al., Ed., Encyclopedia of Polymer Science and Engineering, vol. 13, John Wiley & Sons, New York, 1988, p. 754–789 both of which are hereby included by reference. See Experiments 9 and 10 for methods of making grafted polymers.

By "hydrolyzed" is meant that at least some of the sulfonyl halide groups that may have been in the polymer have been hydrolyzed to the corresponding sulfonic acid groups. Such hydrolyses may be readily carried out, see for instance Experiments 7–10 herein.

By "hydrocarbyl" herein is meant a monovalent radical containing only carbon and hydrogen. It is preferred that hydrocarbyl and hydrocarbylene groups herein have 1 to 30 carbon atoms, unless otherwise specified. By a "hydrocarbylene group" herein is meant a divalent radical containing carbon and hydrogen which may be part of a carbocyclic ring.

In the polymerization process described herein one or more cyclic ethers, oxiranes, oxetanes, tetrahydrofurans, oxepanes, 1,3-dioxolanes, or 1,3,5-trioxanes are polymerized to form a polyether. Oxirane (more commonly called epoxide) is herein given its usual structure, a saturated three membered ring containing two carbon atoms and one oxygen atom. Oxetane is also given its common meaning, a saturated four membered ring containing 3 carbon atoms and one oxygen atom. The term tetrahydrofuran means a saturated 5 membered ring containing 4 carbon atoms and one oxygen atom. The term 1,3-dioxolane means a saturated 5 membered ring which contains two oxygen atoms separated by 1 carbon atom. The term 1,3,5-trioxane means a six membered ring containing 3 oxygen atoms in which the oxygen atoms and carbons atoms are alternated. An oxepane is a saturated seven membered ring which contains 6 carbon atoms and one oxygen atom.

The terms oxirane, oxetane, oxepane. 1,3-dioxolane, 1,3, 5-trioxane, and tetrahydrofuran include compounds containing those ring systems which are substituted with hydrocarbyl or hydrocarbylene groups containing 1 to 20 carbon atoms. The hydrocarbylene groups form carbocyclic rings, which include bicyclic, tricyclic, etc. systems.

Preferred cyclic ethers have the formula I

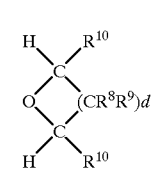

(I)

wherein d is 0, 1, 2 or 4, and each $R^7$, $R^8$, $R^9$ and $R^{10}$ is independently hydrogen or hydrocarbyl containing 1 to 20 carbon atoms. These cyclic ethers polymerize to give polymers with repeat units of the formula —[$CHR^7(CR^8R^9)_d CHR^{10}O$]—. In a more preferred cyclic ether all of $R^7$, $R^8$, $R^9$ and $R^{10}$ are hydrogen. It is also preferred that d=2. In another more preferred cyclic ether where d=2, $R^7$, one of $R^8$, both of $R^9$ and $R^{10}$ are hydrogen, and the remaining $R^8$ is alkyl containing 1–4 carbon atoms, especially preferably the remaining $R^8$ is methyl.

The polymerizations herein are preferably carried out at a temperature of about −80° C. to about +130° C., preferably about 0° C. to about 100° C. If the polymerization is carried out above the atmospheric boiling point of the cyclic ether, a pressure vessel may be required. It will be understood by the artisan that especially for cyclic ethers containing more than 4 atoms in the ring, these polymerizations tend to be equilibrium reactions between polymer and monomer and that higher temperatures usually favor the monomer. Therefore, for these cyclic ethers, temperatures below about 60° C. are favored.

The polymerizations may be carried out in the presence or absence of solvent. In some cases unpolymerized cyclic ether may act as a solvent. If the FSAP is not soluble in the polymerization medium the polyether product may be recovered by separating the FSAP and polyether product, and removing any volatile solvent or excess monomer under vacuum. If the FSAP is soluble in the process medium, the polyether may be recovered by mixing with a solvent in which it is insoluble, or the FSAP may be extracted by a solution of base. The FSAP may then be regenerated by contact with a strong acid. In any event, the FSAP may be reused in the polymerization.

In the following non-limiting Examples and Experiments, the following abbreviations are used:

bp=boiling point
DSC=Differential Scanning Calorimetry
GPC=Gel Permeation Chromatography
MAO=methylalumoxane
Mn=number average molecular weight
mp=melting point
Mw=weight average molecular weight
P/D=polydispersity, Mw/Mn
PS=polystyrene
RT=room temperature
THF=tetrahydrofuran Nafion® NR50 is a perfluorinated copolymer containing about 0.8 equivalents of sulfonic acid per kg of polymer, and is commercially available from E. I. du Pont de Nemours and Company, Wilmington, Del., U.S.A.

In the Experiments in which the fluorinated copolymers are made, the following convention is used for naming α-diimine complexes of metals, which are the polymerization catalysts. The α-diimine is indicated by the letters "DAB". To the left of the "DAB" are the two groups attached to the nitrogen atoms. To the right of the "DAB" are the groups on the two carbon atoms of the α-diimine group. To the right of all this appears the nickel atom, ligands attached to the nickel atom, and finally any anions (X), which when "free" anions are designated by a superscript minus sign (i.e., X−). Of course if there is a "free" anion present, the metal containing moiety is cationic. Abbreviations in these formulas include Pr=propyl, Me=methyl, Ph=phenyl, and An=1,8-naphthylylene.

EXPERIMENT 1

Preparation of $CH_2=CH(CH_2)_2CHICH_2(CF_2)_2OCF_2CF_2SO_2F$

A mixture of 72 g of hexadiene, 127.8 g of $ICF_2CF_2OCF_2CF_2SO_2F$, 7.0 g of Cu powder and 180 mL of hexane was stirred at 90° C. overnight. Solids were removed by filtration and washed with hexane. After removal of volatiles, residue was distilled to give 115.3 g of product, bp 80° C./210 Pa. $^{19}F$ NMR: +45 (t, J=6.0 Hz, 1F), −82.7 (m, 2F), −88.1 (dt, J=42.5 Hz, J=12.6 Hz, 1F), −88.7 (dt, J=45.5 Hz, J=12.6 Hz, 1F), −112.7 (m, 2F), −115.9 (ddd, J=2662.2 Hz, J=30.0 Hz. J=8.2 Hz. 1F), −118.9 (ddd, J=262.2 Hz, J=26.8 Hz, J=7.4 Hz 1F).

EXPERIMENT 2

Preparation of $CH_2=CH(CH_2)_4(CF_2)_2OCF_2CF_2SO_2F$

To a stirred solution of 100 g of $CH_2=CH(CH_2)_2CHICH_2(CF_2)_2OCF_2CF_2SO_2F$ and 200 mL of ether was added 63 g of $Bu_3SnH$ at room temperature. After the addition was complete, the reaction mixture was refluxed for 4 h and then cooled with ice water. Excess of $Bu_3SnH$ was destroyed by addition of iodine. After being diluted with 200 mL of ether, the reaction mixture was treated with a solution of 25 g of KF in 200 mL of water for 30 min. The solids were removed by filtration through a funnel with silica gel and washed with ether. The ether layer was separated and washed with water, aqueous NaCl solution and dried over $MgSO_4$. After removal of the ether, residue was distilled to give 54.7 g of product, bp 72° C./1.3 kPa, and 12.2 g of starting material.

$^{19}F$ NMR: +45 (m, 1F), −82.7 (m, 2F), −88.0 (m, 2F), −112.6 (m, 2F), −11.6 (t, J=18.4 Hz, 2F).

EXPERIMENT 3

Preparation of $CH_2=CH(CH_2)_4(CF_2)_4OCF_2CF_2SO_2F$

A mixture of 24 g of hexadiene, 53 g of $I(CF_2)_4OCF_2CF_2SO_2F$, 3.0 g of Cu powder and 60 mL of hexane was stirred at 70° C. overnight. Solids were removed by filtration and washed with hexane. After removal of volatiles, residue was distilled to give 15.3 g of adduct, $CH_2=CH(CH_2)_2CHICH_2(CF_2)_4OCF_2CF_2SO_2F$, bp 74° C./9 Pa. $^{19}F$ NMR: +45.5 (m, 1F), −82.4 (m, 2F), −83.5 (m, 2F), −112.2 (dm, J=270 Hz, 1F), −112.6 (m, 2F), −115.2 (dm, J=270 Hz, 1F), −124.3 (s, 2F), −125.5 (m, 2F).

To stirred solution of 47 g of $CH_2=CH(CH_2)_2CHICH_2(CF_2)_4OCF_2CF_2SO_2F$ and 150 mL of ether was added 27 g of $Bu_3SnH$ at room temperature. After the addition was complete, the reaction mixture was stirred overnight. Excess of $Bu_3SnH$ was destroyed by addition of iodine. After being diluted with 150 mL of ether, the reaction mixture was treated with a solution of 20 g of KF in 100 mL of water for 30 min. The solids were removed by filtration through a funnel with silica gel and washed with ether. The ether layer was separated and washed with water, aqueous NaCl solution and dried over $MgSO_4$. After removal of the ether, residue was distilled to give 24.7 g of product, bp 103° C./1.3 kPa. $^{19}F$ NMR: +45.4 (m, 1F), −82.4 (m, 2F), −83.5 (m, 2F), −112.6 (t, J=2.6 Hz, 2F), −115.1 (t, J=15 Hz, 2F), −124.3 (s, 2F), −125.7 (t, J=14Hz, 2F). HRMS: Calcd for $C_{12}H_{11}F_{13}SO_3$: 482.0221. Found: 482.0266.

EXPERIMENT 4

The compound

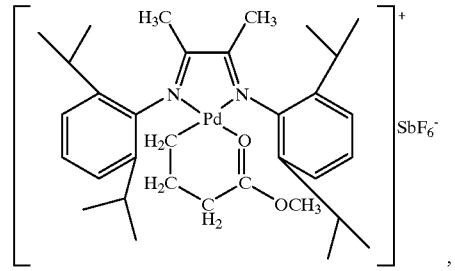

(0.0205 g, 0.024 mmol) and $CH_2=CH(CH_2)_4(CF_2)_4O(CF_2)_2SO_2F$ (3.5 g, 7.26 mmol) were dissolved in 18 mL $CH_2Cl_2$ in a Schienk flask in a drybox. The flask was connected to a Schienk line and the flask was then briefly evacuated and refilled with ethylene from the Schienk line. This was stirred at RT under 1 atm of ethylene for 72 hr. Solvent was evaporated after filtration. The viscous oil was dissolved in 10 mL $CH_2Cl_2$, followed by addition of 100 mL methanol. The upper layer was decanted. The reverse precipitation was repeated two more time, followed by vacuum drying to yield 3.68 g of a light yellow viscous oil. $^1H$ NMR analysis (CDCl$_3$): 89 methyls per 1000 methylene carbons. Comparison of the integral of the $CH_2CF_2$— (2.02 ppm) with the integrals of methyls(0.8–1.0 ppm) and methylenes(1.1–1.4 ppm) indicated a comonomer content of 8.5 mol %. $^{19}F$ NMR (CDCl$_3$): 45.27 ppm, —SO$_2$F; −82.56 ppm, −83.66 ppm, −112.82 ppm, −115.34 ppm, −124.45 ppm, −125.85 ppm, CF$_2$ peaks. The polymer exhibited a glass transition temperature of −57° C. by DSC. GPC (THF, polystyrene standard): Mw=120,000, Mn=78,900, P/D=1.54. The turnover numbers for ethylene and the comonomer are 2098 and 195, respectively.

EXPERIMENT 5

In a Schlenk flask, [(2,6-i-PrPh)$_2$DABAn]NiBr$_2$ (0.012 g, 0.017 mmol) and CH$_2$=CH(CH$_2$)$_4$(CF$_2$)$_4$O(CF$_2$)$_2$SO$_2$F (3.26 g, 6.77 mmol) were dissolved in 35 mL of toluene under stirring. This was pressured with 1 atm ethylene and was allowed to stir at 0° C. for 15 min. MAO (1.7 mL, 8.9 wt % in toluene) was added. This was allowed to vigorously stir at RT for 45 min. Methanol (140 mL) was then added, followed by addition of 1 mL of conc. HCl. The white solid was filtered, followed by methanol wash, vacuum dried to obtain 2.76 g of a white rubbery polymer. $^1$H NMR analysis (o-dichlorobenzene-d$_4$, 100° C.): 98 methyls per 1000 methylene carbons. Comparison of the integral of the —CH$_2$CF$_2$— (2.02 ppm) with the integrals of methyls (0.8–1.0 ppm) and methylenes (1.1–1.4 ppm) indicated a comonomer content of 3.5 mol %. $^{19}$F NMR ((0-dichlorobenzene-d$_4$): 45.19 ppm, —SO$_2$F; –82.70 ppm, –83.72 ppm, –112.96 ppm, 115.09 ppm, –124.37 ppm, –125.83 ppm, CF$_2$ peaks. The polymer exhibited Tm of 97° C. by DSC. Mw=156,000, Mn=90,000, P/D=1.73.

EXPERIMENT 6

The compound

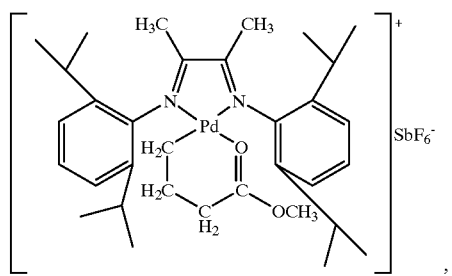

(0.0848 g, 0.1 mmol) and CH$_2$=CH(CH$_2$)$_4$(CF$_2$)$_2$O(CF$_2$)$_2$SO$_2$F (11.5 g, 0.03 mol) were dissolved in 72 mL CH$_2$Cl$_2$ in a Schienk flask in a drybox. The flask was connected to a Schlenk line and the flask was then briefly evacuated and refilled with ethylene from the Schlenk line. This was stirred at RT under 1 atm of ethylene for 72 h. The solution was filtered through Celite and then concentrated to 70 mL. Methanol (400 mL) was added under stirring. The upper layer was decanted. The oil was redissolved in 70 mL CH$_2$Cl$_2$ followed by addition of 350 mL methanol. The viscous oil was collected, vacuum dried and 24.1 g of a light yellow viscous oil was obtained. $^1$H NMR analysis (CDCl$_3$): 113 methyls per 1000 methylene carbons. Comparison of the integral of the CH$_2$CF$_2$— (2.0 ppm) with the integrals of methyls (0.8–1.0 ppm) and methylenes (1.1–1.4 ppm) indicated a comonomer content of 2.9 mol %. The polymer exhibited a Tg of –66° C. by DSC. GPC (THF, polystyrene standard): Mw=186,000, Mn=90,500, P/D=2.06.

EXPERIMENT 7

Hydrolysis of Copolymer

Copolymer made in Experiment 4, containing 8.5 mol % of fluorinated comonomer (1.5 g) was dissolved in 30 mL of THF at room temperature. KOH (0.5 g) in 5 mL of ethanol and 3 mL of water was added and the resulting mixture was stirred at room temperature for six h. After removal of the solvent, residue was treated with diluted HCl for 70 h and then filtered to give solids which were washed with water, HCl and dried under full vacuum at 70° C. for two days to give 1.4 g solid.

EXPERIMENT 8

Hydrolysis of Copolymer

A mixture of 10.6 g of copolymer made in Experiment 6, 5.0 g of KOH, 2 mL of water, 30 mL of ethanol and 30 mL of THF was stirred at RT overnight and at 60 to 70° C. for 5 h. After removal of a half of solvents, residue was treated with Conc. HCl to give rubbery material, which was poured into a blender and blended with water for 30 min. Filtration gave solids, which were washed with conc. HCl, and water and dried under vacuum at 60° C. overnight to give 8.7 g of dark rubbery material. $^{19}$F NMR(THF): –82.8 (br, 2F), –88.5 (br, 2F), –118.3 (br, 2F), –118.5 (br, 2F).

EXPERIMENT 9

Preparation of Grafted Polyethylene

A mixture of 213 g of ICF$_2$CF$_2$OCF$_2$CF$_2$SO$_2$F, 0.5 g of limonene and 30 g of CH$_2$=CH, was heated in a autoclave at 210° C. for 8 h. Distillation of the mixture gave 187.3 g of title compound, bp 88–89° C./3.9 kPa. $^{19}$F NMR: +45.0 (t, J=5.7 Hz, 1F), –82.7 (m, 2F), –87.2 (m, 2F), –112.7 (m, 2F), –119.3 (t, J=17.0 Hz, 2F).

To a stirred solution of 136.2 g (0.3 mol) of ICH$_2$CH$_2$CF$_2$CF$_2$OCF$_2$CF$_2$SO$_2$F and 200 mL of CH$_3$CN was slowly added 38 g (0.376 mol) of Et$_3$N at 75 to 80° C. over 6 h. The reaction mixture was neutralized with conc. H$_2$SO$_4$ at 0° C., and then poured into water and extracted with ether. The ether layer was washed with water and dried over MgSO$_4$. After removal of the ether, a residue was distilled to give 65.3 g of pure product, bp 115–117° C. $^{19}$F NMR: +45.1 (m, 1F), –82.5 (m, 2F), –87.8 (m, 2F), –112.5 (m, 2F), –118.0 (m, 2F). $^1$H NMR: 5.80–6.05 (m).

A four-necked flask fitted with a condenser and an additional funnel was charged with 7.5 g high density polyethylene (Aldrich, Mw=125000), 16.3 g of CH$_2$=CHCF$_2$CF$_2$OCF$_2$CF$_2$SO$_2$F and 80 mL of 1,2-dichlorobenzene. After the apparatus was partially evacuated and refilled with Argon for several times, the flask was heated to 140° C. until all of the polyethylene dissolved, and then cooled to 125° C. (very viscous solution). A solution of 1.23 g of di-t-butyl peroxide in 20 mL of 1,2-dichlorobenzene was slowly added over 7 h. After the addition was complete, the reaction mixture was heated at 130° C. overnight. The hot solution with white solids was poured into 600 mL of acetone to precipitate the polymer, which was cut with ice in a blender to 16.7 g of fine power polymer.

A mixture of 14.0 g of the grafted polymer, 4.5 g of KOH, 50 mL of ethanol, 10 mL of THF and 3 mL of water was stirred at 60° C., for 5 h and at room temperature overnight. After removal of volatiles, residue was treated with conc. HCl for 40 min, filtered, washed with water and HCl and dried at 70° C., in vacuum for 8 h to give 13.2 g of solids, m.p. by DSC was 105° C. and 10% weight loss by TGA was 230° C. in N$_2$. The solids could be pressed to film at 135° C. Elemental analysis revealed that the grafted polymer contained 3.19% sulfur, which indicated that acid equivalent weight was around 1000.

EXPERIMENT 10

Preparation of a Grafted Polyether

An o-dichlorobenzene solution of tert-butyl peroxide (0.60 g peroxide in 7 mL o-dichlorobenzene) was slowly added to a solution of polytetramethylene ether glycol (Mw=11,700, Mn=8,290, polystyrene standard, THF) in o-dichlorobenzene (3.56 g in 20 mL o-dichlorobenzene) maintained at 125° C. The addition was completed in 2.5 h. The solution was allowed to stir at 125° C. for another 6 h. Volatiles were evaporated at 125° C. under full vacuum for 5 h, leaving 9.68 g of a white viscous oil as the product. $^{19}$F NMR(CD$_2$Cl$_2$): 44.5 ppm, —SO$_2$F; -82.8 ppm, -88.2 ppm, -112.8 ppm, -119.4 ppm, CF$_2$ peaks. The polymer exhibited a glass transition temperature of -68° C. by DSC. GPC (THF, polystyrene standard): Mw=27,800, Mn=11,300, P/D=2.46.

To a mixture of 9.67 g CH$_2$=CH(CF$_2$)$_2$O(CF$_2$)$_2$SO$_2$F, the grafted polymer and 2.5 g KOH was added 20 mL THF, 15 mL ethanol and 1.5 mL water. Stirring at RT resulted a exothermic reaction. This was allowed to stir at RT for 1 h and was then refluxed for 5 h. Solvents were evaporated under vacuum. The solid was extracted with 100 mL acetone. This mixture was filtered through Celite®, followed by 3×10 mL acetone wash. To the filtrate was added 130 mL THF. This was filtered through Celite®. Evaporation of the solvents and vacuum drying at 105° C. overnight gave 8.8 g of a brittle yellow solid.

To 4.23 g of the above potassium salt of CH$_2$=CH(CF$_2$)$_2$O(CF$_2$)$_2$SO$_2$F grafted polymer in a flask was added 20 mL conc. HCl. This mixture was vigorously stirred for 20 min at RT. The top layer was decanted. This procedure was repeated another two times using 15 mL of conc. HCl. The viscous oil was dried at 105° C. under full vacuum for 6.5 h. A dark red viscous oil (2.41 g) was obtained.

EXAMPLE 1

In a dry box, the polymer made in Experiment 7 (0.8 g), THF (10.0 g) and acetic anhydride (0.52 g) were placed in a 20 mL vial equipped with a stirring bar. After 22 h at RT, the vial was removed from the dry box and the polymerization terminated by the addition of THF, water and ether. The organic phase was separated, washed with water (2×), dried over anhydrous sodium sulfate, concentrated at reduced pressure and then dried under vacuum, affording 6.65 g of polymer. Mol. Wt. via $^1$H NMR: ~5800. GPC analysis (PS STD.): Mn=28300, Mw=63300, PD=2.24.

EXAMPLE 2

In a dry box, the polymer made in Experiment 7 (0.85 g), THF (10.0 g) and acetic anhydride (1.0 g) were placed in a 20 mL vial equipped with a stirring bar. After 20 h at RT, the vial was removed from the dry box and the polymerization terminated by the addition of THF, water and ether. The organic phase was separated, washed with water (2×), dried over anhydrous sodium sulfate, concentrated at reduced pressure and then dried under vacuum, affording 6.53 g of polymer. GPC analysis (PS STD.): Mn=25300, Mw=57000, PD=2.25.

EXAMPLE 3

In a dry box, the polymer made in Experiment 8 (0.66 g), THF (10.0 g) and acetic anhydride (0.53 g) were placed in a 20 mL vial equipped with a stirring bar. After 20 h at RT, the vial was removed from the dry box and the polymerization terminated by the addition of THF, water and ether. The organic phase was separated, washed with water (2×), dried over anhydrous sodium sulfate, concentrated at reduced pressure and then dried under vacuum, affording 8.33 g of polymer. GPC analysis (PS STD.): Mn=12200, Mw=22000, PD=1.80.

COMPARATIVE EXAMPLE 1

In a dry box, Nafion® NR50 (0.57 g), THF (10.10 g) and acetic anhydride (0.65 g) were placed in a 20 mL vial equipped with a stirring bar. After one h at RT, the vial was removed from the dry box and the Nafion® removed via filtration [Nafion® washed with THF (2×25 mL)]. Water, THF and ether were added and the organic phase separated, concentrated at reduced pressure and then dried under vacuum affording 0.77 g of polymer. GPC analysis (PS STD.): Mn=6040, Mw=15900, PD=2.64.

EXAMPLE 4

In a dry box, the polymer made in Experiment 8 (0.57 g), THF (10.10 g) and acetic anhydride (0.65 g) were placed in a 20 mL vial equipped with a stirring bar. After one h at RT, the vial was removed from the dry box and the polymerization terminated by the addition of THF, water and ether. The organic phase was separated, washed with water (2×), dried over anhydrous sodium sulfate, concentrated at reduced pressure and then dried under vacuum, affording 4.44 g of polymer. GPC analysis (PS STD.): Mn=17600, Mw=26000, PD=1.48.

COMPARATIVE EXAMPLE 2

In a dry box, Nafion® NR50 (0.37 g), THF (10.10 g) and acetic anhydride (0.56 g) were placed in a 20 mL vial equipped with a stirring bar. After two h at RT, the vial was removed from the dry box and the Nafion® removed via filtration (Nafion® washed with THF (2×25 mL)). Water, THF and ether were added and the organic phase separated, concentrated at reduced pressure and then dried under vacuum affording 1.41 g of polymer. GPC analysis (PS STD.): Mn=13700, Mw=29400, PD=2.14.

EXAMPLE 5

In a dry box, the polymer made in Experiment 8 (0.37 g), THF (10.0 g) and acetic anhydride (0.56 g) were placed in a 20 mL vial equipped with a stirring bar. After two h at RT, the vial was removed from the dry box and the polymerization terminated by the addition of THF, water (2–3 mL) and ether, dried over anhydrous sodium sulfate, concentrated at reduced pressure and then dried under vacuum, affording 4.93 g of polymer. GPC analysis (PS STD.): Mn=25700, Mw=42300, PD=1.65.

EXAMPLE 6

In a dry box, the final product of Experiment 10 (0.165 g), THF (10.0 g) and acetic anhydride (0.50 g) were placed in a 20 mL vial equipped with a stirring bar. After stirring for one h at RT, the vial was removed from the dry box and the polymerization terminated by the addition of THF, water and ether. The organic phase was separated, washed with water (2×), dried over anhydrous magnesium sulfate, concentrated at reduced pressure and then dried under vacuum, affording 6.02 g of polymer. GPC analysis (PS STD.): Mn=23400, Mw=38900, PD=1.66.

EXAMPLE 7

In a dry box, the final product of Experiment 10 (0.155 g), THF (3.00 g), THF/3-Me-THF (55/45 mol %, 7.00 g) and acetic anhydride (0.50 g) were placed in a 20 mL vial equipped with a stirring bar. After stirring for one h at RT, the vial was removed from the dry box and the polymerization terminated by the addition of THF, water and ether. The organic phase was separated, washed with water (2×), dried over anhydrous magnesium sulfate, concentrated at reduced pressure and then dried under vacuum, affording 2.71 g of polymer. GPC analysis (PS STD.): Mn=18400, Mw=25700, PD=1.40.

EXAMPLE 8

In a dry box, the final product of Experiment 10 (0.165 g), THF (10.00 g) were placed in a 20 mL vial equipped with a stirring bar. After stirring for one h at RT no polymerization was apparent, the vial was removed from the dry box and the polymerization terminated by the addition of THF, water and ether. The organic phase was separated, washed with water (2×), dried over anhydrous magnesium sulfate, concentrated at reduced pressure and then dried under vacuum, affording 0.19 g of polymer.

EXAMPLE 9

In a dry box, the final product of Experiment 9 (0.50 g), THF (3.0 g), THF/3-Me-THF (55/45 mol %, 7.00 g) and acetic anhydride (0.50 g) were placed in a 20 mL vial equipped with a stirring bar. After stirring for one h RT, the vial was removed from the dry box and the polymerization terminated by the addition of THF, water (1.00 mL) and ether. The solids were removed via filtration and the resulting filtrate concentrated at reduced pressure and then dried under vacuum, affording 2.91 g of polymer. GPC analysis (PS STD.): Mn=11300, Mw=16800, PD=1.48.

COMPARATIVE EXAMPLE 3

In a dry box, Nafion® NR50 (0.50 g), THF (3.0 g), THF/3-Me-THF (55/45 mol %, 7.00 g) and acetic anhydride (0.50 g) were placed in a 20 mL vial equipped with a stirring bar. After stirring for one h at RT, the vial was removed from the dry box and the polymerization terminated by the addition of THF, water (1.00 mL) and ether. The solids were removed via filtration and the resulting filtrate concentrated at reduced pressure and then dried under vacuum, affording 0.70 g of polymer. GPC analysis (PS STD.): Mn=8080, Mw=12400, PD=1.54.

EXAMPLE 10

In a dry box, the final product of Experiment 9 (0.50 g), THF (3.0 g), THF/3-Me-THF (55/45 mol %, 7.00 g) and acetic anhydride (0.50 g) were placed in a 20 mL vial equipped with a stirring bar. After stirring for two h at RT, the vial was removed from the dry box and the polymerization terminated by the addition of THF, water (1.00 mL) and ether. The solids were removed via filtration and the resulting filtrate concentrated at reduced pressure and then dried under vacuum, affording 4.53 g of polymer. GPC analysis (PS STD.): Mn=12200, Mw=22900, PD=1.87.

COMPARATIVE EXAMPLE 4

In a dry box, Nafion® NR50 (0.50 g), THF (3.0 g), THF/3-Me-THF (55/45 mol %. 7.00 g) and acetic anhydride (0.50 g) were placed in a 20 mL vial equipped with a stirring bar. After stirring for two h at RT, the vial was removed from the dry box and the polymerization terminated by the addition of THF, water (1.00 mL) and ether. The solids were removed via filtration and the resulting filtrate concentrated at reduced pressure and then dried under vacuum, affording 2.01 g of polymer. GPC analysis (PS STD.): Mn=9630, Mw=19700, PD=2.04.

Although particular embodiments of the present invention have been described in the foregoing description, it will be understood by those skilled in the art that the invention is capable of numerous modifications, substitutions, and rearrangements without departing from the spirit or essential attributes of the invention. Reference should be made to the appended claims, rather than to the foregoing specification, as indicating the scope of the invention.

What is claimed is:

1. A process for polymerizing a cyclic ether in the presence of a strong Bronsted acid catalyst, which comprises polymerizing a cyclic ether in the presence of a fluorinated sulfonic acid-containing polymer as the strong Bronsted acid containing at least about 0.05 equivalents of fluorinated sulfonic acid group per kg of said fluorinated sulfonic acid containing polymer; containing more hydrogen atoms bound to carbon than fluorine atoms bound to carbon; and said fluorinated sulfonic acid is contained within the grouping —$CR^1R^2CR^3R^4SO_3H$ wherein $R^1$, $R^2$, $R^3$, and $R^4$ are each independently fluorine or perfluoroalkyl.

2. The process as recited in claim 1 wherein about 0.5 to about 2.0 equivalents of said sulfonic acid group are present per kg of said sulfonic acid containing polymer.

3. The process as recited in claim 1 wherein a ratio of said hydrogen atoms bound to carbon to said fluorine atoms bound to carbon is about 5 to about 150.

4. The process as recited in claim 1 wherein said cyclic ether has the formula

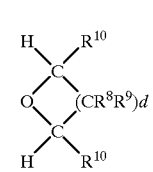

(I)

wherein d is 0, 1, 2 or 4, and each $R^8$, $R^9$ and $R^{10}$ is independently hydrogen or hydrocarbyl containing 1 to 20 carbon atoms.

5. The process as recited in claim 4 wherein d is 2.

6. The process as recited in claim 5 wherein all of $R^8$, $R^9$ and $R^{10}$ are hydrogen.

7. The process as recited in claim 4 wherein all of $R^8$, $R^9$ and $R^{10}$ are hydrogen.

8. The process as recited in claim 5 wherein one of $R^8$, both of $R^9$ and $R^{10}$ are hydrogen, and the remaining $R^8$ is methyl.

9. The process as recited in claim 1 wherein said fluorinated sulfonic acid containing polymer is a hydrolyzed copolymer of one or more olefins selected from the group consisting of ethylene and an α-olefin of the formula $R^5CH=CH_2$, wherein $R^5$ is hydrocarbyl containing 1 to 20 carbon atoms, with a comonomer of the formula $H_2C=CH(CH_2)_aR^6CR^1R^2CR^3R^4SO_2X$, wherein a is an integer of 2 to 20, $R^6$ is a covalent bond or perfluoroalkylene containing 1 to 20 carbon atoms and optionally containing one or more ether groups, and X is halogen.

10. The process as recited in claim 9 wherein $R^6$ is a covalent bond, —$(CF_2)_b$— wherein b is 2 to 20, or —$(CF_2)_d OCF_2CF_2$— wherein d is 2 to 20, and X is fluorine.

11. The process as recited in claim 9 wherein said olefin is ethylene or propylene.

12. The process as recited in claim 9 wherein repeat units derived from said comonomer are about 0.3 to about 50 mole percent of the total number of repeat units in said fluorinated sulfonic acid containing polymer.

13. The process as recited in claim 5 wherein said fluorinated sulfonic acid containing polymer is a hydrolyzed copolymer of one or more olefins selected from the group consisting of ethylene and an α-olefin of the formula $R^5CH=CH_2$, wherein $R^5$ is hydrocarbyl containing 1 to 20 carbon atoms, with a comonomer of the formula $H_2C=CH(CH_2)_aR^6CR^1R^2CR^3R^4SO_2X$, wherein a is an integer of 2 to 20, $R^6$ is a covalent bond or perfluoroalkylene containing 1 to 20 carbon atoms and optionally containing one or more ether groups, and X is halogen.

14. The process as recited in claim 13 wherein $R^6$ is a covalent bond, —$(CF_2)_b$— wherein b is 2 to 20, or —$(CF_2)_d OCF_2CF_2$— wherein d is 2 to 20, and X is fluorine.

15. The process as recited in claim 14 wherein said olefin is ethylene or propylene.

16. The process as recited in claim 1 wherein the polymerization takes place at a temperature between about −80° C. and about +130° C.

17. The process as recited in claim 1 wherein the polymerization takes place at a temperature between about 0° C. and about +100° C.

18. The process as recited in claim 1 wherein said fluorinated sulfonic acid containing polymer is made by grafting and subsequent hydrolysis.

19. The process as recited in claim 18 wherein said grafting is carried out free radically using $H_2C$=$CHCF^2R^6CR^1R^2CR^3R^4SO_2X$, wherein $R^6$ is a covalent bond, fluorosubstituted alkylene containing 1 to 20 carbon atoms and optionally containing one or more ether groups, or alkylene containing 1 to 20 carbon atoms and optionally containing one or more ether groups, and X is halogen or —OH.

* * * * *